(12) United States Patent
Tippel et al.

(10) Patent No.: US 9,212,535 B2
(45) Date of Patent: *Dec. 15, 2015

(54) DIVERSION BY COMBINING DISSOLVABLE AND DEGRADABLE PARTICLES AND FIBERS

(75) Inventors: Philipp Tippel, Graz (AT); Elizabeth W. A. Morris, Aberdeen (GB); Curtis L. Boney, Houston, TX (US); Jason Swaren, Sugar Land, TX (US); John Lassek, Katy, TX (US); Ricardo Ariza, Conroe, TX (US); Desmond E. Rees, Tyler, TX (US); David Ryan Simon, Conroe, TX (US); Michael A. Dardis, Richmond, TX (US); Darrell P. Davis, Longview, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 364 days.

This patent is subject to a terminal disclaimer.

(21) Appl. No.: 13/014,778

(22) Filed: Jan. 27, 2011

(65) Prior Publication Data
US 2011/0226479 A1 Sep. 22, 2011

Related U.S. Application Data

(63) Continuation-in-part of application No. 12/103,041, filed on Apr. 15, 2008, now Pat. No. 8,936,085.

(51) Int. Cl.
*E21B 43/16* (2006.01)
*E21B 33/138* (2006.01)

(52) U.S. Cl.
CPC ........... *E21B 33/138* (2013.01); *C09K 2208/08* (2013.01)

(58) Field of Classification Search
CPC .. E21B 33/138; E21B 43/267; C09K 2208/08

USPC ........... 166/262, 270, 270.1, 280.1, 284, 285, 166/300, 305
See application file for complete search history.

(56) References Cited

U.S. PATENT DOCUMENTS

| 2,754,910 A | 7/1956 | Derrick et al. |
| 2,933,136 A | 4/1960 | Ayers et al. |

(Continued)

FOREIGN PATENT DOCUMENTS

| EP | 0278540 | 8/1992 |
| WO | 0206629 | 1/2002 |
| WO | 2004018840 | 3/2004 |

OTHER PUBLICATIONS

SPE 37489—Understanding Proppant Closure Stress—SK Schubarth, SL Cobb, RG Jeffrey. Copyright 1997, Society of Petroleum Engineers, Inc. Presented at the 1997 SPE Production Operations Symposium, Oklahoma City, OK, Mar. 9-11, 1997.

(Continued)

*Primary Examiner* — James G Sayre
(74) *Attorney, Agent, or Firm* — Mathieu Vandermolen; Rachel Greene; Tim Currington

(57) ABSTRACT

In downhole treatments in the oilfield, ball sealers seated in perforations may not fully seal and may leak fluid through gaps and asperities between the balls and the perforations. A method is given for improving the sealing of ball sealers in perforations by adding a sealing agent that forms a plug in the gaps and severely restricts or eliminates fluid flow. The sealing agent is preferably degradable or soluble, malleable fibers slightly larger than the gaps. Optionally, the particles may be non-degradable, rigid, of different shapes, and smaller than the gaps but able to bridge them. Mixtures of sealing agents may be used. The sealing agent may be added with the ball sealers, after the ball sealers, or both.

21 Claims, 5 Drawing Sheets

(56) References Cited

U.S. PATENT DOCUMENTS

| | | | |
|---|---|---|---|
| 3,144,049 | A | 8/1964 | Ginsburgh |
| 3,292,700 | A | 12/1966 | Berry |
| 3,437,147 | A * | 4/1969 | Davies .................. 166/284 |
| 3,480,079 | A | 11/1969 | Wright et al. |
| RE27,459 | E | 8/1972 | Guinn et al. |
| 3,974,077 | A | 8/1976 | Free |
| 3,998,272 | A | 12/1976 | Maly |
| 4,102,401 | A * | 7/1978 | Erbstoesser .................. 166/284 |
| 4,194,561 | A | 3/1980 | Stokley et al. |
| 4,244,425 | A | 1/1981 | Erbstoesser |
| 4,387,769 | A | 6/1983 | Erbstoesser et al. |
| 4,407,368 | A | 10/1983 | Erbstoesser |
| 4,505,334 | A | 3/1985 | Doner et al. |
| 4,702,316 | A | 10/1987 | Chung et al. |
| 4,715,967 | A | 12/1987 | Bellis et al. |
| 4,716,964 | A | 1/1988 | Erbstoesser et al. |
| 4,753,295 | A | 6/1988 | Gabriel et al. |
| 4,766,182 | A | 8/1988 | Murdoch et al. |
| 4,986,355 | A | 1/1991 | Casad et al. |
| 5,253,709 | A * | 10/1993 | Kendrick et al. ............. 166/284 |
| 5,258,137 | A | 11/1993 | Bonekamp et al. |
| 5,309,995 | A | 5/1994 | Gonzalez et al. |
| 5,330,005 | A | 7/1994 | Card et al. |
| 5,377,760 | A | 1/1995 | Merrill |
| 5,439,055 | A * | 8/1995 | Card et al. .................. 166/280.2 |
| 5,485,882 | A | 1/1996 | Bailey et al. |
| 5,501,275 | A | 3/1996 | Card et al. |
| 5,551,516 | A | 9/1996 | Norman et al. |
| 5,924,295 | A | 7/1999 | Park |
| 5,964,295 | A | 10/1999 | Brown et al. |
| 5,979,557 | A | 11/1999 | Card et al. |
| 5,990,051 | A * | 11/1999 | Ischy et al. .................. 507/204 |
| 6,172,011 | B1 | 1/2001 | Card et al. |
| 6,330,916 | B1 * | 12/2001 | Rickards et al. ........... 166/280.2 |
| 6,380,138 | B1 | 4/2002 | Ischy et al. |
| 6,435,277 | B1 | 8/2002 | Qu et al. |
| 6,599,863 | B1 | 7/2003 | Palmer et al. |
| 6,667,280 | B2 | 12/2003 | Chang et al. |
| 6,703,352 | B2 | 3/2004 | Dahayanake et al. |
| 6,742,590 | B1 | 6/2004 | Nguyen |
| 6,776,235 | B1 | 8/2004 | England |
| 6,837,309 | B2 | 1/2005 | Boney et al. |
| 6,938,693 | B2 | 9/2005 | Boney et al. |
| 7,004,255 | B2 | 2/2006 | Boney |
| 7,055,604 | B2 | 6/2006 | Jee et al. |
| 7,066,266 | B2 | 6/2006 | Wilkinson |
| 7,119,050 | B2 | 10/2006 | Chang et al. |
| 7,166,560 | B2 | 1/2007 | Still et al. |
| 7,244,492 | B2 | 7/2007 | Sinclair et al. |
| 7,273,104 | B2 | 9/2007 | Wilkinson |
| 7,275,596 | B2 | 10/2007 | Willberg et al. |
| 7,318,475 | B2 | 1/2008 | Cavazzoli et al. |
| 7,341,107 | B2 | 3/2008 | Fu et al. |
| 7,350,572 | B2 | 4/2008 | Fredd et al. |
| 7,775,278 | B2 * | 8/2010 | Willberg et al. ........... 166/280.1 |
| 8,936,085 | B2 * | 1/2015 | Boney et al. .................. 166/284 |
| 2002/0007979 | A1 | 1/2002 | Wilson |
| 2003/0060374 | A1 | 3/2003 | Cooke, Jr. |
| 2004/0152604 | A1 | 8/2004 | Qu et al. |
| 2004/0261993 | A1 | 12/2004 | Nguyen |
| 2005/0113263 | A1 | 5/2005 | Brown et al. |
| 2005/0230107 | A1 | 10/2005 | McDaniel et al. |
| 2005/0272613 | A1 | 12/2005 | Cooke, Jr. |
| 2006/0021753 | A1 | 2/2006 | Wilkinson |
| 2006/0032633 | A1 | 2/2006 | Nguyen |
| 2006/0118301 | A1 | 6/2006 | East, Jr. et al. |
| 2006/0169453 | A1 | 8/2006 | Savery et al. |
| 2006/0175059 | A1 | 8/2006 | Sinclair et al. |
| 2007/0044958 | A1 | 3/2007 | Rytlewski et al. |
| 2007/0187099 | A1 | 8/2007 | Wang |
| 2008/0196896 | A1 | 8/2008 | Bustos et al. |
| 2009/0101334 | A1 | 4/2009 | Baser et al. |
| 2009/0255674 | A1 * | 10/2009 | Boney et al. .................. 166/284 |

OTHER PUBLICATIONS

SPE 39945—Induced Stress Diversion: A Novel Approach to Fracturing Multiple Pay Sands of the NBU Field, Uintah Co., Utah, TW Hewett, CJ Spence, Copyright 1998 Society of Petroleum Engineers, Inc. Presented at the 1998 SPE Rocky Mountain Regional/Low-Permeability Reservoirs Symposium and Exhibition, Denver, CO Apr. 5-8, 1998.

International Search Report and Written Opinion of International Application No. PCT/US2012/022964 mailed Oct. 4, 2012, 10 pages.

* cited by examiner

DIVERSION BY COMBINING DISSOLVABLE AND DEGRADABLE PARTICLES AND FIBERS

PRIORITY

This application is a continuation in part application of U.S. patent application Ser. No. 12/103,041, entitled, "Improving Sealing by Ball Sealers," filed Apr. 15, 2008, which is incorporated by reference herein.

FIELD

The invention relates to methods to tailor the composition and behavior of fluids for use in oilfield applications for subterranean formations. More particularly, the invention relates to fluids employed for diversion in combination with but not limited to perforation sealers.

BACKGROUND OF THE INVENTION

The statements in this section merely provide background information related to the present disclosure and may not constitute prior art.

Wellbore isolation during stimulation (for example by fracturing, acidizing, and acid fracturing) is performed by a variety of methods within the oilfield industry. One of the approaches involves the use of ball sealers, which are meant to seal the perforations and prevent fluid in the wellbore from flowing through the perforations into the formation.

Ball sealers are typically spheres designed to seal perforations that are capable of accepting fluid, and thus divert reservoir treatments to other portions of a target zone. Ball sealers are slightly larger than the perforations and are incorporated in the treatment fluid and pumped with it. They are carried to the perforations by the fluid flow, seat in the holes, and are held there by differential pressure. The effectiveness of this type of mechanical diversion requires keeping the balls in place and completely blocking the perforations, and depends on factors such as the differential pressure across the perforation, the geometry of the perforation, and physical characteristics of the ball sealers.

In some applications, the term perforation sealer or ball sealer refers to materials used in the oilfield in subterranean formations to seal-off perforations inside the casing. To differentiate between perforation sealers and particles, the perforation sealer has a cross sectional area that is equal to or larger than the single perforation in order to seat on and seal-off the perforation hole. Perforation sealers may be made of any material including degradable/dissolvable/soluble, elastic, deformable, hard, etc. substances and be of any geometrical shape such as spheres, cubes and cones.

Ball sealers are made in a variety of diameters, densities, and compositions, to adjust for different wellbore conditions and for perforation size. They may be either soluble or non-soluble. Soluble ball sealers are most commonly made of one soluble component, while non-soluble ball sealers often consist of a rigid core surrounded by a rubber (or other material) coating. The shortcoming of either ball sealer type lies in the relationship of the shape and composition of the ball sealer and the shape of the entry hole in the casing. Due to the nature of shooting perforations into casings, one obtains burrs and uneven surfaces that are difficult to seal with a smooth and/or spherical ball. In addition, an elongation of the entry hole may occur due to the casing curvature and the gun orientation when shooting perforations with a non-centralized perforating gun.

Generally, embodiments of this invention relate to fluids used in treating a subterranean formation. The majority of these stimulations are carried out as bullhead treatments utilizing perforation sealers and limited entry design as means of diverting fluid inside the wellbore to target zones. This technique gives satisfactory results in terms of diversion. However, wellbore pressure building is seen during subsequent "ball-off" of perforations as perforation sealers reach perforations, re-stimulation treatments lack the targeted pressure building effect from perforation sealers, and production response deteriorates as compared to early stimulation treatments. The root cause for this behavior is believed to be an ineffective sealing action of perforation sealers due to the following conditions, as well as a combination of these:

Corroded/eroded perforations
Scale forming around and on the perforation
Casing buckling/deformation:
  Deformation of the metal as the area behind the liner is dissolved (formation) or degrades (cement)
  Deformation of the metal due to pressure changes (during fracture treatments or during production)
Altered perforation shape due to liner deformation
Casing collapse with and without cracks The outcome is a perforation that is not as suitable a shape for seating the diverter ball as initially created when first made. Often, to counteract this behavior, the approach to resolve these problems is to drop more balls which, obviously, do not render a solution to this problem as proven by multiple treatments in the past.

A method that utilizes readily available components and is effective is needed. There is a need for improving the ability of ball sealers to close off perforations completely. A desirable method includes pumping suitable particles and fibers to plug the small flow paths that may otherwise remain in the perforations around the seated ball sealers.

SUMMARY OF THE INVENTION

One embodiment of the Invention is a method for improving the seal of ball sealers seated in holes in a casing in a well penetrating a subterranean formation when there is at least one gap between a ball sealer and a hole (for example a perforation) in which it is seated. The method involves injecting a sealing agent that includes particles that form a plug that inhibits fluid flow through the gap. The sealing agent may optionally be a fiber, may optionally be malleable, may optionally be degradable under downhole conditions, and may optionally be soluble in the formation fluid or in a well treatment fluid that is already present or subsequently injected. The sealing agent may be a mixture of fibers and particles of a shape other than fibrous, and the fibers and particles of a shape other than fibrous may differ in composition. Some or all of the particles may have at least one dimension smaller than the gap, or at least one dimension larger than the gap. The sealing agent may be a mixture of sizes in which some of the particles have at least one dimension smaller than the gap and some of the particles have at least one dimension larger than the gap.

The sealing agent may be injected with the ball sealers; optionally only a portion of the sealing agent may be injected with the ball sealers and the remainder after the ball sealers. All of the sealing agent may be injected after the ball sealers. The sealing agent may be injected remedially, that is after at least one well treatment fluid has been injected, and leaking around previously placed ball sealers is detected or suspected. After a diverting step, the sealing agent may be included in a subsequently diverted treatment fluid, preferably at low concentration. The sealing agent may be released from a downhole tool, for example a basket or bailer.

Another embodiment of the invention is a method for improving the seal of a ball seated in an orifice in a tool in a well penetrating a subterranean formation when there is at least one gap between the outer boundary of the ball and the inner boundary of the orifice in which it is seated. The method involves injecting a sealing agent including particles that form a plug that inhibits fluid flow through the gap.

Yet another embodiment of the invention is a composition for diverting fluid from holes, for example perforations, that includes particles that form a plug that inhibits fluid flow through a gap between a seated ball sealer and a perforation.

DETAILED DESCRIPTION

Figure 1:
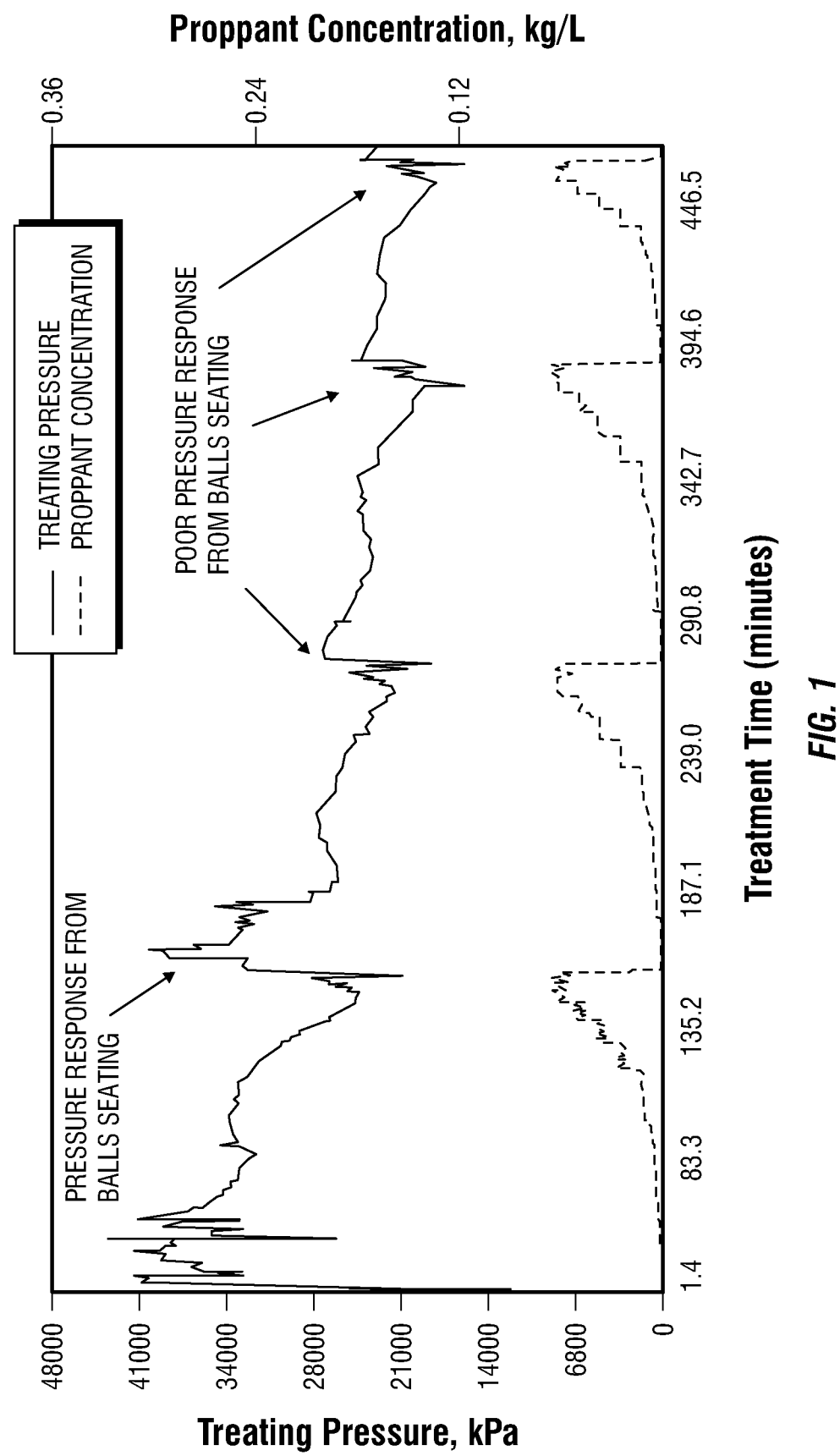
FIG. 1 shows the surface pressure vs. time in a typical multiple fracture treatment with ball sealers used for diversion between stages.

The description and examples are presented solely for the purpose of illustrating the different embodiments of the invention and should not be construed as a limitation to the scope and applicability of the invention. While the compositions of embodiments of the present invention are described herein as comprising certain materials, it should be understood that the composition could optionally comprise two or more chemically different materials. In addition, the composition can also comprise some components other than the ones already cited. Although some of the following discussion emphasizes fracturing, the compositions and methods may be used in any well treatment in which diversion is needed. Examples include fracturing, acidizing, water control, chemical treatments, and wellbore fluid isolation and containment. Embodiments of the invention will be described in terms of treatment of vertical wells, but is equally applicable to wells of any orientation. Embodiments of the invention will be described for hydrocarbon production wells, but it is to be understood that the invention may be used for wells for production of other fluids, such as water or carbon dioxide, or, for example, for injection or storage wells.

It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

Embodiments of the invention improve traditional perforation sealer induced fluid diversion in bullhead treatments carried out in wells troubled by casing deformation, scale build-up and/or corrosion across perforation intervals by utilizing dissolvable particulates and fibers. This has the beneficial effect of increasing the sealing efficiency and enhancing the subsequent seating of perforation sealers by depositing an instant filter cake around them. Another application is to reduce fluid leak-off through liner cracks that act as thief zones jeopardizing fluid diversion into the target zones. For the application described herein, the variety of "possible" perforation geometries (scaled and deformed) together with casing cracks makes fibers alone ineffective to bridge inside the wellbore at elevated pressure differential (>400 psia) across the liner wall.

When multiple hydrocarbon-bearing zones are stimulated by hydraulic fracturing or chemical stimulation, it is desirable to treat the multiple zones in multiple stages. In multiple-zone fracturing, for example, a first pay zone is fractured. Then, the fracturing fluid is diverted to the next stage to fracture the next pay zone. The process is repeated until all pay zones are fractured. Alternatively, several pay zones may be fractured at one time, if they are closely located and have similar properties. Diversion may be achieved with various means. Some commonly used methods for diversion in multiple fracturing stages are bridge plugs, packers, other mechanical devices, sand plugs, limited entry, chemical diverters, self-diverting fluids, and ball sealers.

The solids (fibers and particles) used during the treatment must dissolve under prevailing down-hole conditions within reasonable time (1-2 days) after the treatment so that perforation sealers dislodge from perforations and flow back of stim fluids can be commenced without jeopardizing surface facilities. Hence, degradable/dissolvable fibers and particles will be used. To accelerate fiber dissolution, degradation additives in solid or liquid form can be added to the recipe or pumped as an overflush.

The following range of additive concentrations for base fluid formulation and fiber/particle loading is desirable.

Base fluid
  polymer loading: 10-50 lbs/1000 galUS of base fluid
  viscoelastic surfactant:
    5-10 galUS/1000 gal US of base fluid
    7.5-30 galUS/1000 gal US of base fluid
Fibers: 20-150 lbs/1000 galUS of base fluid
Total dissolvable particles (solids not including fibers):
  50-3000 lbs/1000 galUS of base fluid; this includes various solid particle additives and their combination for the full range of weight ratio, e.g. 0-100% solid acid: 0-100% sodium benzoate: 0-100% benzoic acid.

The perforation sealers will be pumped in a slug of 1-150 bbls from surface containing the degradable fibers and particles. Some embodiments may benefit from using this process with a coiled tubing system.

Some embodiments may incorporate this process into an acid treatment fluid system that uses solid acid fibers for diversion in acid fracturing treatments could benefit from the introduction of degradable particles as an addition to the fibers in order to reduce leak-off through natural fractures to a larger degree. Additionally, in multi-stage acid fracturing near-wellbore diversion using fibers and solid acid could be achieved using methods traditionally associated with proppant placement.

It should be noted that while the present discussion is in terms of perforations and perforating guns, other openings in the casing, and other methods of making them, fall within the scope of embodiments of the invention. For example, "perforations" may be holes cut in the casing by a jetting tool or by a chemical flash technique, for example using an explosive or a propellant. Such holes are commonly not circular. Furthermore, perforating guns are commonly not centralized in a wellbore (for example, so that other tools may pass by them); when non-centralized guns shoot shots not aimed perpendicular to the casing, non-circular perforations result. Even initially circular holes (as well as non-circular holes) may initially have or may develop asperities. Initial asperities may come, for example, from the burrs (or metal ridges and/or other uneven and irregular surfaces) that are commonly left in, on, and along the edges of the holes inside a casing after perforation. Asperities may develop after the holes are formed, for example by erosion caused by pumping proppant slurry or by corrosion caused by pumping acid.

Ball sealers used in embodiments of the invention may be any known ball sealers, of any suitable composition and three dimensional shape. Nonlimiting examples include sphere, egg shaped, pear shaped, capsular, ellipsoid, granular, and the like, and the surfaces of such may vary from essentially smooth to rough. Ball sealers, and components forming them, may have any size and shape suitable for the application; sizes and shapes are selected on the basis of the size and shape of the holes to be sealed. Any suitable materials may be used to form the ball sealers. Nonlimiting examples of materials useful for making ball sealers include phenolic resin, nylon resin, syntactic foam, curable materials with high compressive strength, polyvinyl alcohol, collagen, rubber, polyglycolic acid, and polylactic acid. Ball sealers may have a core of one material, typically rigid, and an outer layer of another, typically deformable, for example, rubber over metal. Some of these materials have the ability to undergo elastic and/or plastic deformation under pressure, but this may not be sufficient to create satisfactory seals. Some of these materials may be degradable or soluble.

The sealing ability of ball sealers may be improved by adding a "sealing agent" to the fluid that carries the balls to the perforations. The improvement may be a complete or a partial stoppage of leaks; the improvement may be permanent or temporary. The sealing agent is a solid particulate material that is carried to and forms a plug in any gaps or asperities between the ball and the perforation where the ball has seated and is attempting to seal. Formation of the plug is caused by the flow resulting from a leak. For typical ball sealer and perforation sizes, the gaps or asperities may typically range in size from about 0.03 to about 0.75 cm. Many materials and shapes are suitable for the sealing agent, but the preferred materials are degradable, or dissolvable, and the preferred shapes are fibers. If the sealing agent is degradable or dissolvable, it naturally disappears in time under the downhole conditions. A suitable material is chosen so that it degrades or dissolves in an appropriate time (by the time flow through the perforation is again desired) under the downhole conditions (for example of temperature, salinity, and pH). If the sealing agent is non-degradable, it is removed in the same way and at the same time as non-degradable balls are removed, by reversing the fluid flow with a sufficient pressure differential.

The insoluble or non-degradable sealing agent (and/or the balls) are then allowed to fall to the bottom of the wellbore, or to float or be carried to the surface, as desired. Degradable sealing agents are preferred so that they don't interfere with other operations or equipment after the diversion treatment has been completed. Malleable sealing agents are preferred because they may deform, which may aid in forming a leak-free plug. However, non malleable sealing agents may be used, especially if the ball sealers are deformable. Further, if the outer shell of the ball sealers is suitable, sufficiently rigid sealing agent particles may partially penetrate the ball, which may improve the seal. An example would be a metal sealing agent (for example a fiber) and a rubber-coated ball. Some or all of the individual particles of the sealing agent may have at least one dimension larger than the gaps or asperities between the ball and the hole. Optionally, some or all of the sealing agent particles may be smaller than the gaps or asperities between the ball and the hole but large enough for a small number of particles to bridge across the gaps; determining the sizes of particles that bridge gaps is well known in the art. Optionally, the sealing agent may be a mixture of particles larger than the gaps or asperities and smaller than the gaps or asperities, or even smaller than (but capable of bridging in) gaps formed initially in the plug formed by the larger sealing agent particles. If present as the balls reach the holes, sealing agent particles should be small enough, and optionally but preferably malleable enough, not to interfere with the seating of the balls.

The sealing agents may be in any shape: for example, powders, particulates (for example round, ovoid, cubed, and pellet-shaped), beads, chips, flakes, platelets, ribbons or fibers; they may be random or non-randomly shaped. The particulates may be coated and non-coated, porous and non-porous. Coatings may be used to delay or accelerate degradation or dissolution. Preferred embodiments may use these materials in the form of fibers. The fibers may have a length of about 2 to about 25 mm, preferably about 3 to about 18 mm. Typically, the fibers have a denier of about 0.1 to about 20, preferably about 0.15 to about 6. The fibers may be core-sheath, side-by-side, crimped, uncrimped, bundled, and fibrillated. Known methods for including fibers in treatment fluids and suitable fibers are disclosed in U.S. Pat. No. 5,501,275, which is hereby incorporated by reference in its entirety. Mixtures of fibers and other shapes, for example powders, particulates, beads, chips, flakes, platelets, and ribbons may be used. The fibers alone, or the fibers and other shapes, may all be of the same composition or may be mixtures of materials having different compositions. They may also be made of one material containing a second, filler, material. The different shapes and/or different compositions may also be in different sizes. For example, smaller particles of a different shape may be used to improve the performance of fiber sealing agents even further.

Examples of materials useful as sealing agents include water-soluble materials selected from water-soluble inorganic materials (for example, carbonates), water-soluble organic materials, and combinations of these materials. Suitable water-soluble organic materials may be water-soluble natural or synthetic polymers or gels. The term "polymers" includes oligomers, co-polymers, and the like, which may or may not be cross-linked. The water-soluble polymers may be derived from a water-insoluble polymer made soluble by main chain hydrolysis, by side chain hydrolysis, or by a combination of these two methods, for example when exposed to a weakly acidic environment. Furthermore, the term "water-soluble" may have a pH characteristic, depending upon the particular material used. For example, glass fibers are considered water-soluble because they are readily soluble in aqueous HF solutions, and slowly soluble in brines and mildly acidic solutions, especially at higher temperatures. Metals may be solubilized with appropriate salts or acids. Suitable insoluble and/or non-degradable materials include ceramics, some salts, metals (for example steel, aluminum and copper, for example in the form of wires, needles, and shavings) and carbon, for example, carbon fibers.

Suitable water-insoluble polymers which may be made water-soluble by acid hydrolysis of side chains include those selected from polyacrylates, polyacetates, and the like and combinations of these materials. Suitable water-soluble polymers or gels include those selected from polyvinyls, polyacrylics, polyhydroxy acids, and the like, and combinations of those materials. Suitable polyvinyls include polyvinyl alcohol, polyvinyl butyral, polyvinyl formal, and the like, and combinations of these materials. Polyvinyl alcohol is available from Celanese Chemicals, Dallas, Tex. U.S.A., under the trade name CELVOL™. Individual CELVOL™ polyvinyl alcohol grades vary in molecular weight and degree of hydrolysis. Polyvinyl butyral is available from Solutia Inc. St. Louis, Mo., U.S.A., under the trade designation BUTVAR™. Suitable polyacrylics include polyacrylamides and the like and combinations of these materials, such as N,N-disubstituted polyacrylamides, and N,N-disubstituted polymethacrylamides. Suitable polyhydroxyacids may be selected from polyacrylic acid, polyalkylacrylic acids, interpolymers of acrylamide/acrylic acid/methacrylic acid, combinations of these materials, and the like.

Suitable materials include polymers or co-polymers of esters, amides, or other similar materials. They may be partially hydrolyzed at non-backbone locations. Examples include polyhydroxyalkanoates, polyamides, polycaprolactones, polyhydroxybutyrates, polyethyleneterephthalates, polyvinyl alcohols, polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. Polymers or co-polymers of amides, for example, may include polyacrylamides. Materials that dissolve at the appropriate time under the encountered conditions are also used, for example polyols containing three or more hydroxyl groups. Polyols useful in the present invention are polymeric polyols solubilizable upon heating, desalination or a combination of these methods, and consist essentially of hydroxyl-substituted carbon atoms in a polymer chain spaced from adjacent hydroxyl-substituted carbon atoms by at least one carbon atom in the polymer chain. In other words, the useful polyols are preferably essentially free of adjacent hydroxyl substituents. In one embodiment, the polyols have a weight average molecular weight greater than 5,000 up to 500,000 or more, and from 10,000 to 200,000 in another embodiment. The polyols may if desired be hydrophobically modified to inhibit or delay solubilization further, e.g. by including hydrocarbyl substituents such as alkyl, aryl, alkaryl or aralkyl moieties and/or side chains having from 2 to 30 carbon atoms. The polyols may also be modified to include carboxylic acid, thiol, paraffin, silane, sulfuric acid, acetoacetylate, polyethylene oxide, quaternary amine, or cationic monomers. In one embodiment, the polyol is a substituted or unsubstituted polyvinyl alcohol that can be prepared by at least partial hydrolysis of a precursor polyvinyl material with ester substituents. Although it is normally not necessary, the degradation may be assisted or accelerated by a wash that contains an appropriate dissolver or that changes the pH or salinity. The degradation may also be assisted by an increase in temperature, for example when the treatment lowers the bottomhole temperature, and that temperature increases with time towards the formation temperature. For example, a fluid having a specific, controlled pH and/or temperature may be pumped into the well; the sealing agent is exposed to the fluid and begins to degrade, depending on the sealing agent composition and the fluid chosen. The degradation may be controlled in time to degrade quickly, for example over a few seconds or minutes, or over longer periods of time, such as hours or days. Below, when we use the terms degradable or soluble, we include all of these suitably dissolvable materials.

Other materials that are suitable as sealing agents include materials previously used for fluid loss control, lost circulation control, and diversion. Examples include rock salt, graded rock salt, benzoic acid flakes, wax beads, wax buttons, and oil-soluble resin materials. However, these materials have been used to build filter cakes on wellbore or fracture faces; they have not been used to improve the sealing of ball sealers or to block fractures of any shape, such as elongated cracks. The sizes and shapes may be the same as previously used or may be new.

Sealing agents, for example fibers, are typically added in an amount of from about 0.03 lbs (0.013 kg)/perforation to about 0.5 lbs (0.227 kg)/perforation, preferably from about 0.1 to about 0.167 lbs (about 0.045 to 0.076 kg)/perforation. Sealing agents are typically injected at a concentration of from about 2 to about 200 ppt (pounds per thousand gallons) (about 0.24 to about 24 g/l), preferably from about 5 to about 150 ppt (about 0.6 to about 18 g/l). The maximum concentrations of these materials that can be used may be preferred, but may be limited by the surface addition and blending equipment available. Sealing agents are typically added in small slugs of fluid, for example of about 24 bbl (about 3785 liters), although smaller increments, for example 1 bbl (about 160 liters) or less are common. The sealing agent is most commonly added by means of the proppant blender; if the diversion stage follows a proppant stage, some of the sealing agent may be mixed with the last 100 or 200 pounds (22 to 45 kg) of proppant. The sealing agent may be added either at the same time as the ball sealers, or, preferably, in the same fluid but just after the ball sealers. The sealing agent may also be tailed in part way through the release of the ball sealers. The balls and sealing agent may be delivered from a small tubing line provided for that purpose and having a ball dropper, separate from the main injection line or lines. The sealing agent may be injected until a pressure spike indicates that sealing is satisfactory. Any carrier fluid may be used, provided that it can carry the ball sealers and sealing agent, and does not unduly degrade or dissolve either until they are no longer needed. The fluid may, for example, be nitrogen, water, brine, slickwater, a foam, an acid, a gelled oil, or water viscosified, for example, with a linear polymer, a crosslinked polymer, or a viscoelastic surfactant. The perforating tool may be in place, but preferably has been moved away before the balls and sealing agent are placed. The sealing agent and/or the balls may also be released from a downhole tool. For example, the sealing agent may be released from a downhole basket or bailer, such as one having a positive displacement mechanism. Such a bailer may be connected to a wireline, coiled tubing, a jetting device, or a gun assembly. Suitable bailers have been described in U.S. patent application Ser. No. 11/857,859, hereby incorporated in its entirety. The composition and method may be used in any type of well and situation in which ball sealers are used: vertical, deviated, horizontal, and multiple; production, storage, injection, and others; stimulation, completion, workover, remediation, and others; wells for hydrocarbons, carbon dioxide, water, brine, helium and other fluids. The typical operation is to shoot a set of perforations, treat a formation, seal the perforations, move the guns and shoot another set, treat, seal, move, shoot, treat, seal, etc. until all zones have been treated. Then the balls and sealing agent are removed. However, it is within the scope of embodiments of the invention to shoot more than one set of perforations at once or to remove some of the balls (and associated sealing agent) before all the treatments have been done.

When there is a leak around a ball (a gap between the ball and the hole, for example caused by an asperity in the hole), it may grow worse with time. A leak means fluid flow; fluid flow leads to the possibility of erosion or corrosion, especially if the pressure drop across the partially sealed hole is large, or increases after successive treatments. Although the methods are most commonly employed during or immediately after the placement of the ball sealers, it is within the scope of embodiments of the invention to use the methods remedially, that is, at some time after the balls are seated, when a leak may develop or be detected. It is also within the scope of embodiments of the invention to inject a second slurry of sealing agent after an initial treatment with a sealing agent, or to maintain a very low concentration of sealing agent (for example about 0.1 g/l) in a fluid in contact with the balls, for example, a fluid being diverted.

Although embodiments of the invention has been described in terms of ball sealers used to seal holes in casing, balls (and other devices such as darts) are used in other ways in the oilfield, for example, to activate or deactivate tools, to change a flow path within a tool, etc. Seals around these balls or other devices may also leak, and may also be improved by the methods described herein.

While the invention has been disclosed with respect to a limited number of embodiments, those skilled in the art, having the benefit of this disclosure, will appreciate numerous modifications and variations. It is intended that the appended claims cover such modifications and variations as fall within the true spirit and scope of the invention. The present invention can be further understood from the following examples.

FIG. 1 shows the progress of a fracturing treatment of several successive zones with diversion by ball sealers (without fibers) between stages. The first fracturing treatment started a few minutes into the portion of the job shown; the surface pressure started at about 41,000 kPa and decreased as the fracture was generated and the proppant was pumped. After about two hours, proppant was stopped and balls were dropped. The seal appeared to be good; when the next fracturing treatment was begun, the initial pressure, and the pressure during the proppant stages were about the same as in the first treatment. The process was repeated a third time. However, in this case, when fracturing was resumed (at the same pump rate and proppant concentrations), the surface pressures were much lower, indicating that ball sealers from one or both of the previous treatments were leaking. A fourth fracturing treatment was even worse.

Figure 2:
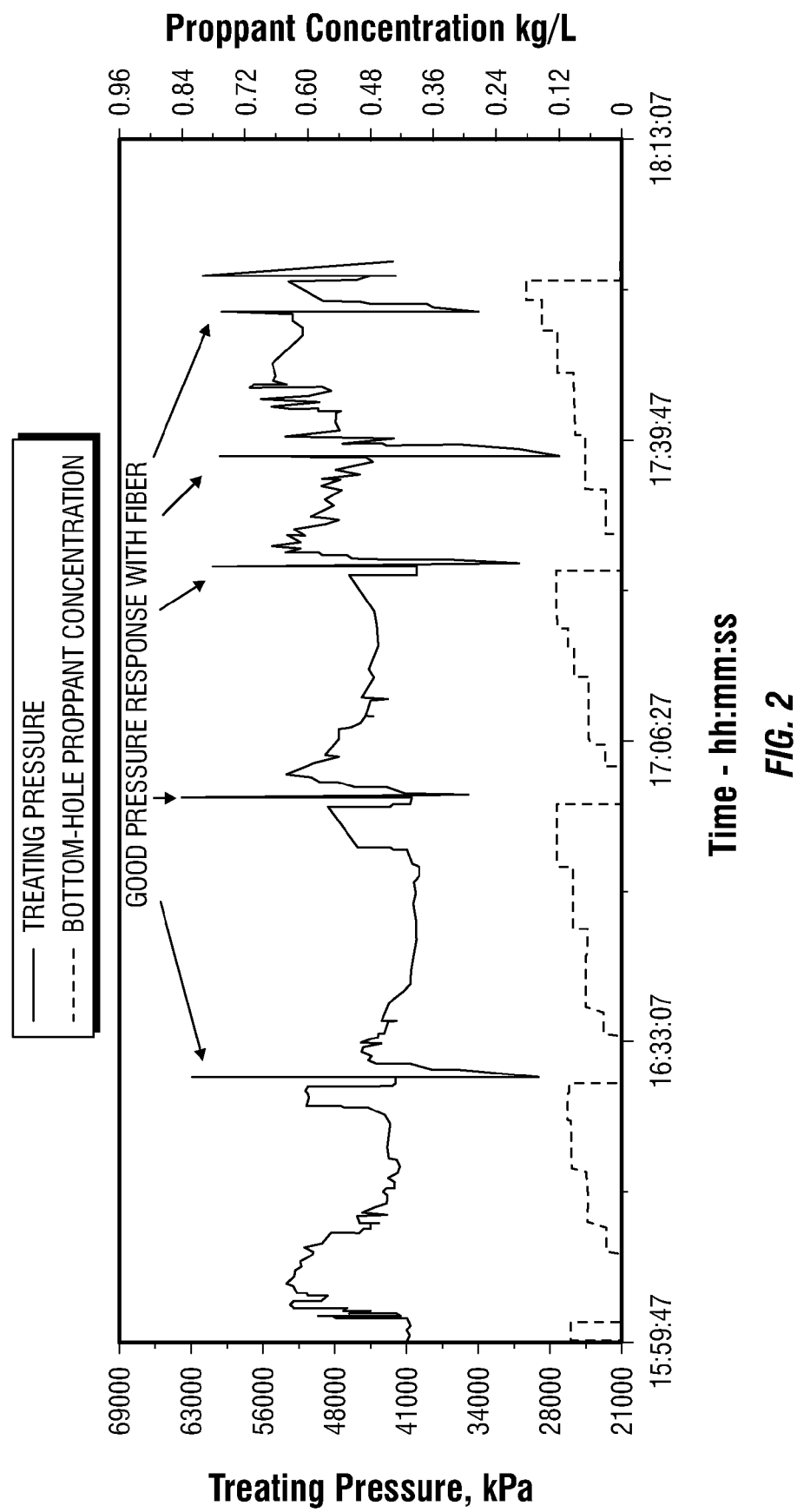
FIG. 2 shows the surface pressure vs. time in a typical multiple fracture treatment with ball sealers and fibers used for diversion between stages.

FIG. 2 shows a comparable job in which polylactic acid fibers were added as sealing agent using the blender. The total amount of fibers added was 40 lbs (18.1 kg) with the concentration varying from 2 to 150 ppt (0.24 to 18 g/l). In this job, it can be seen that the pressure recovered after each diversion step. In fact the pressure went up after each but the first fracturing treatment, which would be expected when fracturing successively lower permeability zones. These results show that the combination of ball sealers plus fibers placed after each treatment was very effective in diverting fracturing fluid to the next set of perforations.

Embodiments of the invention have been simulated and tested in the lab on different slot sizes and perforation shapes with varying fiber concentrations with the perforation sealer in place. Hence, combining fibers with particles in order to create a load bearing framework or pack in form of a filter cake that can resist pressure differentials in excess of 1300 psia (typical pressures seen in "New Wells") while reducing leak-off through balled-off perforations of irregular shape and casing cracks has proven effective in lab tests. The leak-off characteristics are a strong function of the mesh range (grain size) of the particles introduced into the fiber laden fluid system and the viscosity of the fluid filtrate, which can be confirmed by lab tests. Lab tests have been carried out with a fluid loss cell investigating the effect of fibers and particles on bridge formation across and leak-off reduction on irregular perforation shapes and slots with the perforation sealer in place. The results show the favorable effect of fiber-particle combination on filter cake stability and reduced leak-off across perforation sealer as compared to a sole fiber-laden fluid formulation.

The test assembly includes an ordinary fluid loss cell normally utilized to simulate filter cake build-up on the wellbore wall while drilling. However, the test plate and end cap have been specifically modified to examine two main scenarios:

First, the potential to seal off a gap between an altered perforation shape and a ball sealer.

Second, the ability to seal off cracks that were not designed as circular perforation holes but can act as leak-off paths while fluid injection. Usually such cracks form in subterranean installations due to material failure but could also be induced intentionally by e.g. sand jetting or slotted liner installations. Spherical ball sealers by virtue of their geometrical nature are not designed to seat on such geometries. Hence, fibers and particles without ball sealers are considered for the purpose of plugging such cracks. Fibers only could not form or maintain a bridge across gap apertures of more than 0.05" at elevated pressures (>400 psia) and dynamic conditions, that is, fluid flowing through the gap due to high pressure differentials.

Figure 3:
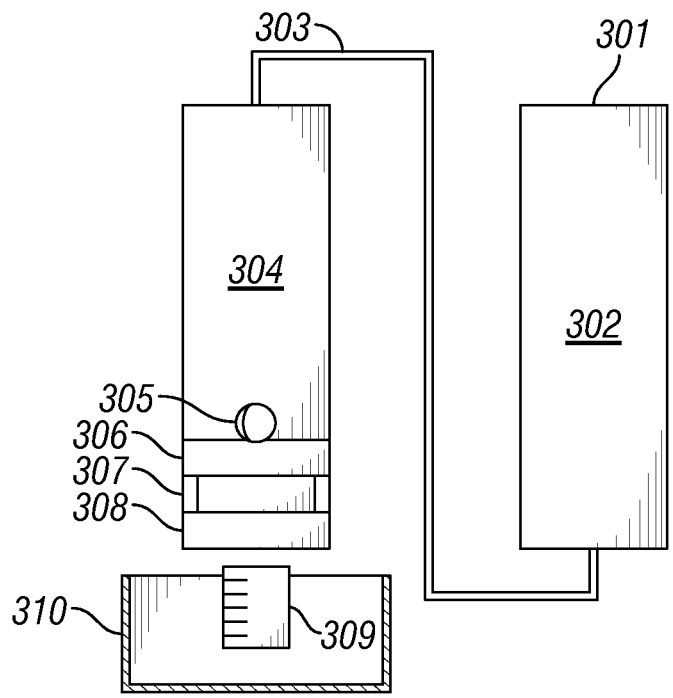
FIG. 3 is a schematic diagram of a test apparatus.
Figure 4A:
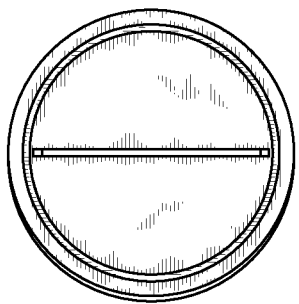
FIG. 4 is a series of photographs to illustrate the test plates used in the apparatus illustrated by FIG. 3.
Figure 4B:
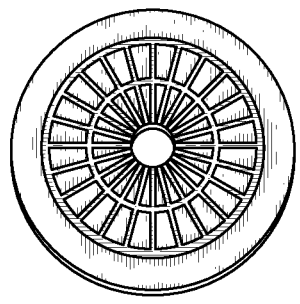
Figure 4C:
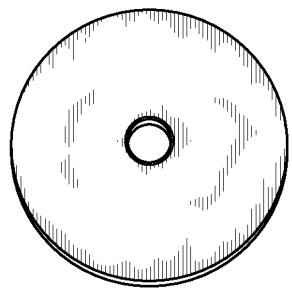
Figure 4D:
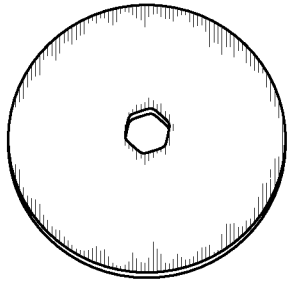
Figure 4E:
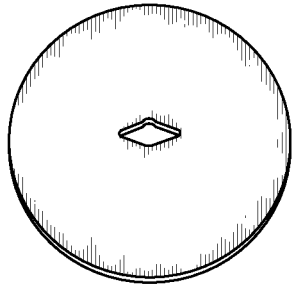
Figure 4F:
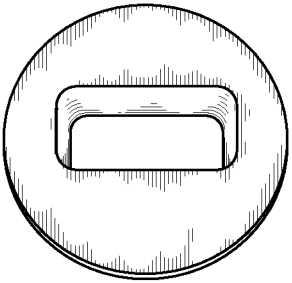

The lab equipment for the purpose of testing includes the following parts, as illustrated by FIG. 3.

Two cylindrical steel chambers named "cell 1" 302 and "cell 2" 304 in FIG. 3 with a volume of 500 mL each and a pressure rating of 1500 psia. Nitrogen supply 301 enters cell 302. Thus, cell 1 302 contained the displacement fluid (base fluid for the test fluid). Cell 2 304 contained a test fluid (base fluid and fibers and/or particulates) and the perforation ball 305.

One 0.25" braided steel high pressure line 303 connecting the two chambers. Fluid from "cell 1" 302 is displaced into "cell 2" 304 through this high pressure line 303.

Nitrogen bottle and regulator valve 301 supplying pressure to "cell 1" 302 in order to displace fluid into "cell 2" 304. Maximum pressure supply is limited to 1500 psia and can be regulated to any pressure between atmospheric and 1500 psia.

One test plate 306 with a circular rubber seal (O-Ring, not shown) between the plate 306 and the chamber 304 wall. The different test plates incorporated in the lab testing are outlined in FIG. 4.

One spacer 307 which upon the test plate 306 is resting.

One modified end cap 308 to fix the test plate 306 in place and not posing a restriction to the fluid flow across the test plate 306. A beaker 309 was placed at the base of the assembly containment tray 310.

The test plates were designed with the following intentions:

Standard plate in FIG. 4: 0.32" (8.13 mm) diameter circular hole to accommodate one perforation ball sealer and generate a base line for friction pressure losses across the system and the test plate for the fluid formulation under investigation and to evaluate ball sealer sealing ability and subsequent extrusion of the ball sealer due to the pressure differential applied across the test plate.

Spider's Web plate in FIG. 4: 0.32" (8.13 mm) diameter circular hole with groves cut in plate to mimic corrosion/erosion and burrs that prevents the ball sealer from efficiently sealing around its entire circumference on a circular perforation hole. Additionally, fluid approaches the ball sealer from the side rather than top and generates a lifting force that pushes the ball sealer off the test plate.

Hexagonal and rhombohedral test plate in FIG. 4: To mimic different perforation shapes that are not as suitable a geometry for a perforation ball sealer to seat on, e.g. any geometry other than perfectly circular in case of a spherical ball sealer. The shapes should represent perforation deformation, erosion and other mechanisms rendering the perforation hole non-circular. Hence, a gap between a spherical perforation ball sealer and a hole non-circular in shape is present representing a leak-off path for the injected fluid bypassing the perforation ball sealer and being discharged through the end cap to atmospheric pressure.

Slot Plate in FIG. 4: 5 test plates with different gap apertures were utilized:
Slot width 0.050" (1.270 mm)
Slot width 0.075" (1.905 mm)
Slot width 0.100" (2.540 mm)
Slot width 0.125" (3.175 mm)
Slot width 0.150" (3.810 mm)
The slot is cut across the plate representing cracks in casing from material failure, sand jetting or slotted liners. This plate is used to investigate the ability of fibers only and fibers plus particles to form a bridge across the slot and deposit a filter cake. In this configuration the ball sealer has no effect on narrowing the gap.

Components utilized in lab testing:
Polymer base fluid with polymer loadings between 10-50 lbs/1000 gal.
Solid acid fibers in concentrations between 30 and 70 lbs/1000 gal
Solid acid pearls in concentrations between 30 and 600 lbs/1000 gal
Solid acid flakes in concentrations between 30 and 600 lbs/1000 gal
One perforation ball sealer with 5/8" diameter and a specific gravity of 1.3. The ball sealer is made up of an exterior rubber coating with a solid nylon core of 0.5" diameter.

All tests were carried out at room temperature. The sequence outlined below refers to FIG. 3.
1. Prepare 1 Liter of polymer base fluid without fibers and particles
2. Add the selected fiber and particle concentration (no particles in case of testing fibers only) to 500 mL of polymer base fluid and stir until homogeneous distribution is achieved.
3. Install test plate of choice into "cell 2"
4. Insert perforation ball sealer resting on test plate
5. Fill "cell 1" with 500 mL of polymer base fluid without fibers and particles and connect to nitrogen supply
6. Fill "cell 2" with 500 mL of fiber-particle laden fluid formulation (invention) and connect to high pressure line.
7. Adjust nitrogen regulator valve to test pressure: two pressure settings were used for each fluid formulation:
Low pressure differential test: 750 psia
High pressure differential test: 1500 psia
8. Apply nitrogen pressure
9. Open isolation valve between nitrogen supply and "cell 1"
10. Monitor fluid volume passing from "cell 1" into "cell 2" and discharged through the end cap
11. Clock time for fluid to discharge through modified end cap at "cell 2"
12. Isolate nitrogen supply
13. Monitor pressure in "cell 2"
14. Bleed-off pressure from both chambers after 2 minutes
15. Disassemble "cell 2" and check for filter cake build-up on test plate
16. Weigh fibers and particles discharged into the beaker below the end cap These were used with pumping diverter balls (5/8", 1.3 SG). First all test plates were examined for leakage between the ball sealer and the geometry of the test plate.

The following test plates could not be used for fiber bridge evaluation due to a total seating of the ball sealer on the geometry:
Standard test plate
Spider's web test plate
Hexagonal test plate While a complete seal between ball sealer and test plate was expected for the standard plate, it was surprising that the extrusion of the ball sealer was enough to even completely seat on the spider's web and hexagonal test plate. These results show that a major alteration in the perforation shape must occur in order for the ball sealer employed (rubber coated) not to seal effectively. Hence, these 3 plates were dismissed from the testing sequence including fibers. An imprint of the hexagonal shape on the rubber coating of the ball sealer used in an experiment on the hexagonal test plate due to extrusion was visible to the experimenter.

The subsequent examples illustrate the results of experiments with fibers only versus fibers plus particles carried out on slot and rhombohedral test plates.

When the base fluid and fibers were used with no additional particles, no bridging occurred. When diverter aids were used with the base fluid and fibers, bridging occurred. This is also illustrated by the following chart, summarizing results for a system with a slot shaped plate.

| Fiber Lb/Kgal | PLA Particle lb/Kgal | Benzoic Acid Particle lb/Kgal | Start Pressure psi | End Pressure psi | Time seconds |
|---|---|---|---|---|---|
| None | None | None | 750 | atm | 14 |
| 50 | None | None | 750 | atm | 16 |
| 150 | None | None | 750 | atm | 16 |
| 70 | 160 | None | 750 | 630 | 37 |
| 70 | None | 160 | 750 | 580 | 31 |

Figure 5A:
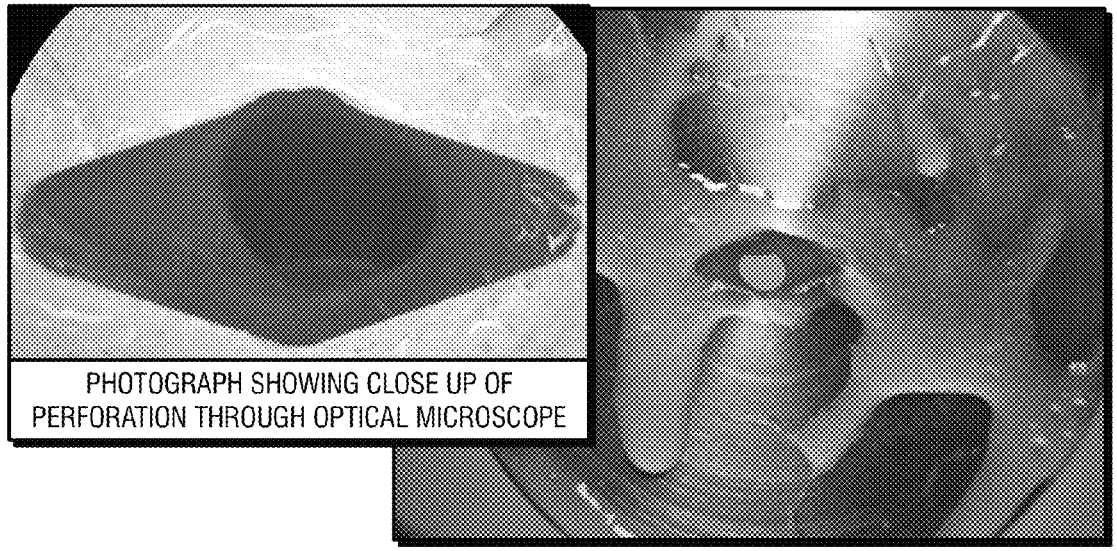
FIGS. 5A-5C are photos of a test series carried out on a rhombohedral perforation shape (diamond) mimicking perforation deformation for the base fluid formulation with fibers only (top illustration) and with fibers plus particles (bottom illustration).
Figure 5B:
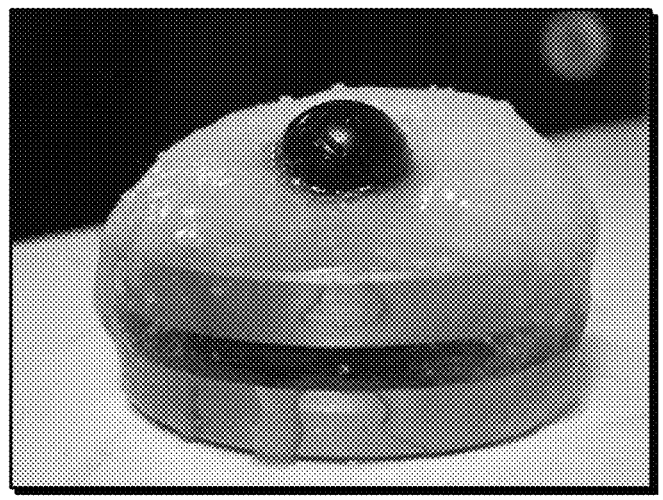
Figure 5C:
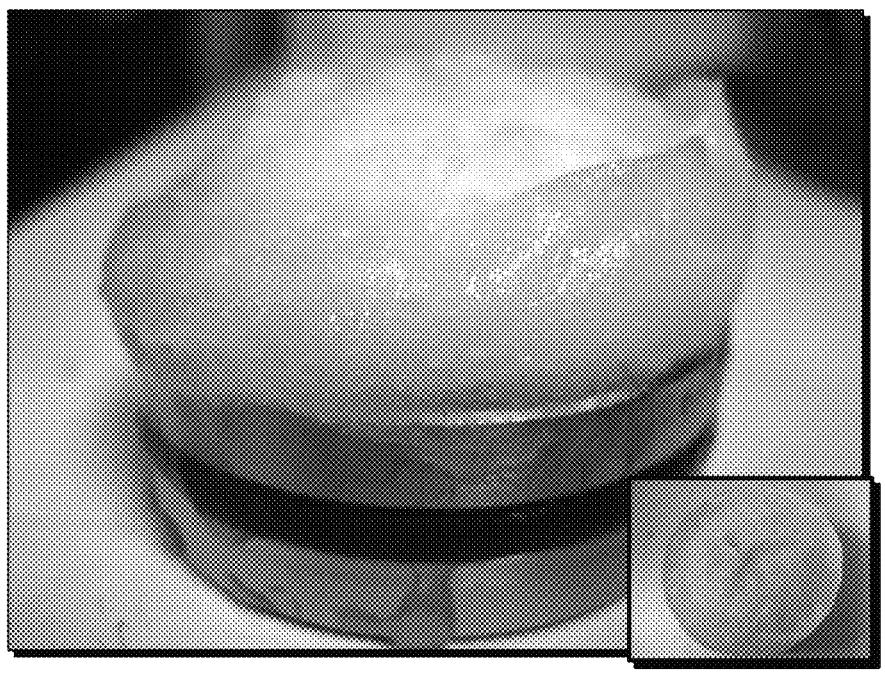
Figure 6A:
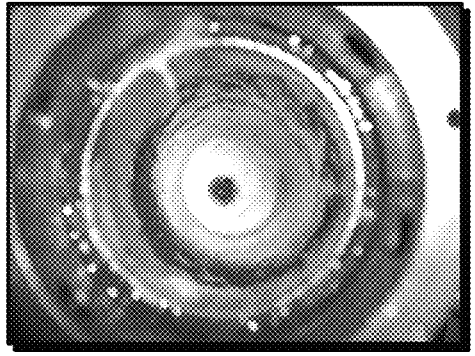
FIG. 6 is a series of photos of a test series carried out on a slot shape (0.050" width) mimicking casing cracks for the base fluid formulation with fibers (50 lbs/1000 galUS) plus particles (160 lbs/1000 galUS).
Figure 6B:
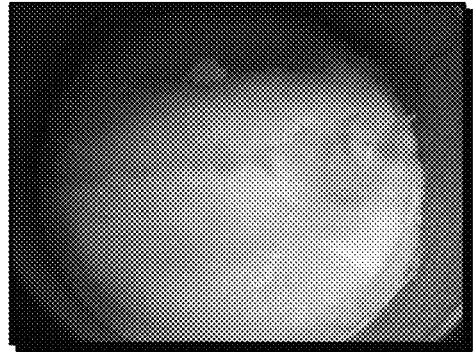
Figure 6C:
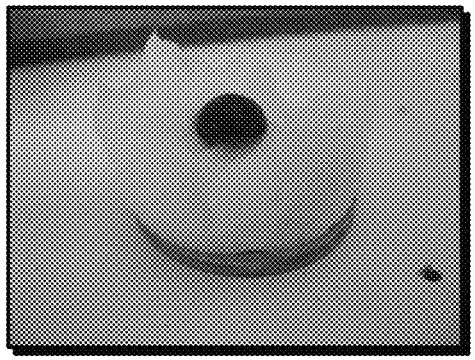
Figure 6D:
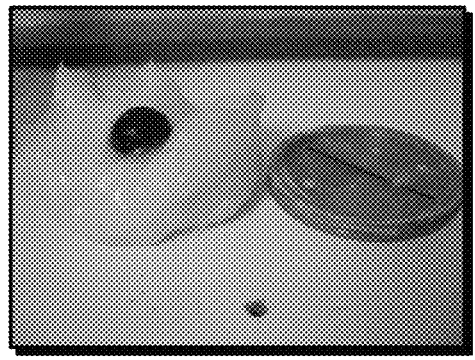

FIGS. 5A-5C are photos of a test series carried out on a rhombohedral perforation shape (diamond) mimicking perforation deformation for the base fluid formulation with fibers only (top illustration) and with fibers plus particles (bottom illustration). Fluid formulation used for fiber only:
Base fluid polymer loading: 50 lbs/1000 gal
Solid acid fiber concentration: 50 lbs and 150 lbs/1000 gal The experiment was run with 50 and 150 lbs/1000 gals of solid acid fibers without the addition of solid particles at a pressure differential of 750 psi across the test plate. The ball sealer was removed after the test. No fiber bridging and a subsequent filter cake build-up occurred; even a fiber concentration of 150 lbs/1000 gal could not induce bridging across the gap between the ball sealer and rhombohedral geometry. It took 10 seconds to empty both chambers, cell 1 and 2, and pressure equalized instantly to atmospheric conditions upon isolation of nitrogen supply (750 psia). For the high differential pressure experiment at 1500 psia the same could be observed, that is, no bridging of fibers occurred and it took 6 seconds to empty both chambers.

The underlying reason for failure of fibers only in depositing a filter cake in this configuration can be addressed to the low stiffness of solid acid fibers paired with gap apertures too large for bridging to occur due to the drag forces exerted on the fibers by fluid bypassing the ball sealer through the gap. Higher pressure differentials infer even higher drag forces rendering fibers only ineffective in this configuration. Another approach has to be utilized for sealing off the geometry formed between ball sealer and rhombohedral shape.

Again, the combination of fibers and particles was effective in depositing a filter cake around the perforation sealer (bottom) while fibers alone showed no onset of bridge formation and being discharged through the clearance between perforation and perforation sealer. The fiber-particle pack was able to reduce the leak-off during fluid injection by 2.5 times as compared to the case without particles. Furthermore, after injection has stopped it took longer than 2 minutes for the applied pressure across the plate to drop from 750 psi to 600 psi. This is an improvement over the fluid formulation without particles which took less than 5 seconds to equalize the applied pressure across the plate to atmospheric conditions.

The experiment was repeated for the same set up with a modified fluid formulation.

The fluid formulation used for fiber and particle included the following.

Base fluid polymer loading: 50 lbs/1000 gal
Solid acid fiber concentration: 50 lbs/1000 gal
Solid acid pearls with mesh size of 18/40: 160 lbs/1000 gal Filter cake built up on the test plate after test series run at 750 psia and 1500 psia differential pressure. Visual observations indicated that the ball sealer is fully covered by the fiber particle pack, solely black shading in the center indicates the ball sealer in place.

In both experiments the same fluid formulation was used. The combination of fibers and particles was effective in depositing a stable filter cake around the perforation ball sealer as opposed to fibers only. The first experiment was run at 750 psia pressure differential, while the second run was carried out at 1500 psia. The fiber-particle pack was able to reduce the leak-off during fluid injection by 2.5-3 times in both experiments as compared to the case without particles. Furthermore, after injection has stopped it took 2 minutes for the applied pressure across the plate to drop from 750 psi to 600 psi for the first experiment and from 1500 to 860 psi for the second run. This is an improvement over the fluid formulation without particles which instantly equalized the applied pressure across the plate to atmospheric conditions.

FIG. 6 is a series photos of a test series carried out on a slot shape (0.050" width) mimicking casing cracks for the base fluid formulation with fibers (50 lbs/1000 galUS) plus particles (160 lbs/1000 galUS). The filter cake build-up around the perforation sealer is evident. Previous experiments at fiber loadings up to 150 lbs/1000 galUS of base fluid but without the addition of particles were unsuccessful in bridging across the slot. The incorporation of particles reduced fluid leak-off across the slot by 2.5-3 times and chamber pressure read between 580-630 psi for consecutive experiments 2 minutes after stopping fluid injection from initially 750 psi.

Firstly, experiments were run for a fluid formulation with fibers only. Fluid formulation used for fibers only:
Base fluid polymer loading: 50 lbs/1000 gal
Solid acid fiber concentration: 50 and 150 lbs/1000 gal Concentrations of 50 and 150 lbs/1000 gals of solid acid fibers were used. Fluid was injected into cell 2 and across the slot test plate at a pressure differential of 750 psia. No fiber bridging and a subsequent filter cake build-up occurred; even a fiber concentration of 150 lbs/1000 gal could not induce bridging across the slot with all the fluid and fibers being discharged through the end cap. It took 8 seconds to empty both chambers, cell 1 and 2, and pressure equalized instantly to atmospheric conditions upon isolation of nitrogen supply (750 psia). The high pressure differential test with 1500 psi showed no onset of bridging both chambers emptied in no less than 6 sec with instant equalization to atmospheric pressure upon nitrogen supply isolation. Another approach has to be utilized for sealing off the slot/crack.

The experiment was repeated for the same set up with a modified fluid formulation applying the invention and its embodiments claimed in this patent.

Fluid formulation used for fiber and particle:
Base fluid polymer loading: 50 lbs/1000 gal
Solid acid fiber concentration: 50 lbs/1000 gal
Solid acid pearls with mesh size of 18/40: 160 lbs/1000 gal Filter cake build up on the test plate after test series run at 750 psia and 1500 psia differential pressure was observed. In these experiments, the ball sealer did not serve any particular function other than showing filter cake height.

Visual observations were made of the filter cake deposited on the slot plate (0.05" slot width) inside the fluid loss cell and after disassembly. The filter cake build-up is evident. Previous experiments at fiber loadings up to 150 lbs/1000 galUS of base fluid but without the addition of particles were unsuccessful in bridging across the slot. The incorporation of particles reduced fluid leak-off across the slot by 2.5-3 times and chamber pressure read between 580-630 psi for consecutive experiments 2 minutes after stopping fluid injection from initially 750 psi.

A similar experiment was performed at a differential pressure of 1500 psia. The combination of fibers and particles was effective in depositing a stable filter cake across the slot as opposed to fibers only. The fiber-particle pack was able to reduce the leak-off during fluid injection by 2.5 times compared to the case without particles. Furthermore, after injection has stopped it took 2 minutes for the applied pressure across the plate to drop from 1500 psi to 720 psi. This is an improvement over the fluid formulation without particles which instantly equalized the applied pressure across the plate to atmospheric conditions.

Also, deformation of the slot test plate after the 1500 psia differential pressure test was observed. The fiber-particle pack held 1500 psia across the plate resulting in a permanent deformation of the test plate which indicates the integrity of the filter cake.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of using a fluid within a subterranean formation, comprising:
    forming a fluid comprising fibers and particles;
    introducing perforation sealers into the fluid;
    introducing the fluid into the subterranean formation;
    forming a seal in a perforation in the formation; and
    allowing the fibers or particles or both to degrade,
    wherein the perforation sealers are separate from the fibers and the particles.

2. The method of claim 1, further comprising controlling a rate of fluid introduction using a pressure observation.

3. The method of claim 1, further comprising controlling the concentration of fibers and particles using a pressure observation.

4. The method of claim 1, further comprising controlling the volume of perforation sealers introduced into the fluid using a pressure observation.

5. The method of claim 1, wherein the allowing the degrading comprises a time for shut-in of the well.

6. The method of claim 1, further comprising initiating flow-back without allowing fibers or particles or both introduced during the treatment to flow to an upper surface of the formation.

7. The method of claim 1, wherein the forming a fluid and introducing the sealers occurs before introducing the fluid into the formation.

8. The method of claim 1, wherein introducing the fluid into the formation occurs before the introducing the perforation sealers.

9. The method of claim 1, wherein introducing the perforation sealers occurs before introducing the fluid into the subterranean formation.

10. The method of claim 1, wherein the concentration of the particles is higher than the concentration of the fibers.

11. A method of using a fluid within a subterranean formation, comprising:
    forming a fluid comprising fibers and particles;
    introducing perforation sealers into the fluid;
    introducing the fluid into the subterranean formation;
    observing a pressure measurement of the subterranean formation; and
    allowing the fibers or particles or both to degrade,
    wherein the perforation sealers are separate from the fibers and the particles.

12. The method of claim 11, further comprising controlling a rate of fluid introduction using the pressure measurement.

13. The method of claim 11, further comprising controlling the concentration of fibers and particles using the pressure measurement.

14. The method of claim 11, further comprising controlling the volume of perforation sealers introduced into the fluid using the pressure measurement.

15. The method of claim 11, wherein the allowing the degrading comprises a time for shut-in of the well.

16. The method of claim 11, further comprising initiating flow-back without allowing fibers or particles or both introduced during the treatment to flow to an upper surface of the formation.

17. The method of claim 11, wherein the forming a fluid and introducing the sealers occurs before introducing the fluid into the formation.

18. The method of claim 11, wherein introducing the fluid into the formation occurs before the introducing the perforation sealers.

19. The method of claim 11, wherein introducing the perforation sealers occurs before introducing the fluid into the subterranean formation.

20. The method of claim 11, wherein the concentration of the particles is higher than the concentration of the fibers.

21. The method of claim 1, wherein the at least one of the perforation sealers is seated in the perforation, and wherein the fibers and the particles plug openings that remain between the seated at least one perforation sealer and the perforation.

* * * * *